United States Patent [19]

Hill

[11] Patent Number: 4,734,324

[45] Date of Patent: Mar. 29, 1988

[54] HEAT SEALABLE MICROPOROUS POLYPROPYLENE FILMS

[75] Inventor: David J. Hill, Wilmington, Del.

[73] Assignee: Hercules Incorporated, Wilmington, Del.

[21] Appl. No.: 30,801

[22] Filed: Mar. 27, 1987

[51] Int. Cl.⁴ .................................................. B32B 3/26
[52] U.S. Cl. ............................ 428/317.3; 428/317.7; 428/317.9; 428/516; 428/910
[58] Field of Search ............... 428/315.5, 315.7, 315.9, 428/317.1, 317.3, 317.7, 317.9, 319.7, 319.9, 516, 910

[56] References Cited

U.S. PATENT DOCUMENTS

| | | | |
|---|---|---|---|
| 3,903,234 | 9/1975 | Ikeda | 264/154 |
| 3,908,650 | 9/1975 | Dunshee et al. | 428/317.5 |
| 4,359,497 | 11/1982 | Magder et al. | 428/195 |
| 4,582,752 | 4/1986 | Duncan | 428/315.5 |
| 4,596,738 | 6/1986 | Metcalfe et al. | 428/315.5 |
| 4,626,460 | 12/1986 | Duncan | 428/315.5 |
| 4,632,869 | 12/1986 | Park et al. | 428/315.5 |

Primary Examiner—William J. Van Balen
Attorney, Agent, or Firm—William S. Alexander

[57] ABSTRACT

This invention relates to a microporous film having a heat sealable layer on one or both sides thereof. The porosity and permeability of the microporous layer are retained despite the application of the heat seal layer.

8 Claims, No Drawings

HEAT SEALABLE MICROPOROUS POLYPROPYLENE FILMS

It is known to make porous films of polyolefin by extruding film of polyolefin resin containing a relatively large concentration of certain filler materials and drawing that film either uniaxially or biaxially by a specified amount to effect biaxial or uniaxial orientation. During the course of the drawing operation, the polymer is caused to tear away from the filler, creating a void in the film matrix. The film becomes opaque as a result of this void formation. If the amount of filler is sufficient, i.e., greater than about 30%, the voiding is sufficient to cause the film to become porous or breathable. Ikeda et al, in U.S. Pat. No. 3,903,234 and also Magder in U.S. Pat. No. 4,359,497 teach the preparation of such films.

Microporous films have many applications in packaging of, e.g., fruits and plants where it is desirable to allow the packaged item to breathe or to allow respired water vapor to escape. Such films are also finding application as breathable cover stock in personal hygiene applications such as catamenial napkins, panty liners or diapers. In many of these applications it is desirable to bond the film either to itself to effect a package seal or to another structural element in a specific item being prepared. To date such bonding has normally been accomplished by addition of an adhesive to the specific area of the film at which the seal or bond is to be made.

It is the object of this invention to provide a heat sealable porous film which can be produced in one step without need of an off-line application of adhesive coating. A further objective is to provide a heat sealable porous film which is heat sealable over its entire surface.

In accordance with this invention, the above objects are accomplished by a gas permeable microporous film comprising a voided polyolefin matrix polymer film having, on at least one of its surfaces, a coating of a heat sealable polymer having a melting point at least about 10° C. lower than that of the voided matrix polymer.

The voided matrix polymer film of this invention is a uniaxially or biaxially oriented polyolefin film. The matrix can be any film forming, orientable homopolymer of an olefin having 2 to 4 carbon atoms, a copolymer of such an olefin and another olefin having 2 to 8 carbon atoms or a mixture of such polymers. A preferred matrix polymer is homopolypropylene or a mixture of homopolypropylene with a propylene-ethylene copolymer.

Voiding of the matrix is effected by incorporation of about 30 to 70% by weight, based on total weight of polymer plus filler, of certain particulate materials thereinto as described, e.g., in the Ikeda et al and Magder patents cited hereinabove. Each of those references employs calcium carbonate as the voiding material. Other materials which are known to cause voiding include, e.g., barium sulfate, glass beads, and particulate, high melting organic polymers such as nylon. Choice of voiding material is not critical to the practice of the invention, although the intended application sometimes dictates selection of a specific material. For most applications, calcium carbonate is satisfactory and will be the material of choice.

It is critical that the heat seal layer be a polymer which melts at a temperature at least about 10° C. below the melting point of the matrix polymer. It is, therefore, able to be melted in order to form a heat seal without disturbing the orientation of the matrix. Moreover, the low melting polymer is molten at the temperature of orientation of the matrix polymer and as a result it cracks and generates its own voids during the orienting draw. Accordingly, a large number of the voids formed in the oriented layer as a result of the drawing are left unobstructed. In places where the heat seal layer is intact, i.e., not voided, that layer is so thin that it exhibits a good degree of permeability in its own right. Additionally, it is possible to have a void-producing particulate in the heat seal layer. As a result of the voiding and the inherent permeability of the thin heat seal layer, the porosity and permeability of the oriented matrix layer are retained, although they may be decreased to some extent.

Polymers which can serve as the heat seal layer include, by way of example, medium and low density polyethylene, including copolymers and terpolymers of ethylene with alpha-olefins of 3 to 8 carbon atoms, having melting points between about 50° and 120° C., ethylene—vinyl acetate copolymers, ethylene—acrylic acid copolymers and ionomers thereof, and poly(vinylidene chloride). The preferred heat seal polymer is a low density (0.917–0.930 g/cc) polyethylene.

The heat sealable layer is thin relative to the matrix polymer layer. Normally the thickness ratio of matrix polymer to heat seal polymer will be at least about 3 to 1 up to about 20 to 1, preferably about 5 to 1 to 20 to 1. The heat sealable layer can be applied to one side or both sides of the matrix layer. In most cases it will be on only one side. If the heat seal layer is present on both sides, most usually, the layer will be the same on each side.

The novel films of the invention can be prepared via a coextrusion technique. In this known technique, all of the polymer layers are extruded simultaneously through a single die which brings them together while each is in the molten state. In a single step, a multi-layer structure is formed in which, due to their having been contacted while molten, adhesion between layers is extremely good. The films can also be prepared by an extrusion coating technique wherein the heat seal layer is applied, at a second extrusion station, to a previously formed matrix film. When this technique is employed, the matrix film is usually drawn longitudinally prior to the application of the heat seal film. This technique is not usually preferred, however, since less cracking and void formation of the heat seal layer is possible when only the single drawing is imposed on it.

Following preparation of the layered film structure, the film is subjected to either a uniaxial or biaxial draw to impose molecular orientation on the matrix layer and to cause voiding and pore or crack formation in the individual layers. Orientation is carried out according to known techniques at a temperature above the glass transition temperature and below the melting point. In the case of the polyolefins, this will usually be between about 130° and 150° C. For maximum voiding and pore formation in the matrix film, it is preferred that the temperature be maintained as low as possible. Typical orientation levels are about 4 to 6x in each direction for most polyolefin films.

The invention is demonstrated in the following examples. In these examples the film properties determined are Gurley porosity and heat seal characteristics. Gurley porosity measures the time needed for 10 ml of air at 12.2 in. of water pressure to pass through 1 in.$^2$ of film. It is determined by ASTM D726-5B (reapproved 1971), Method B. The heat seals are made by use of a Sentinel impulse-type heat sealer (Model 12-12AS) to seal the film to itself or other substrates. The properties of the seal are determined by using an Instron tensile tester or similar device to peel the seals as specified by ASTM F88.

EXAMPLE 1

A film according to the invention was prepared by coextruding a 50/50 mixture of propylene homopolymer and a propylene—ethylene copolymer containing 60% calcium carbonate based on the weight of the total composition with a low density polyethylene (VLDPE from Union Carbide). The homopolymer was Pro-fax 6501 (MFR 4; MP 164° C.) from HIMONT Incorporated and the copolymer was Pro-fax SA-841 (MFR 8; MP 156° C.), also from HIMONT Incorporated. The matrix layer thickness was 18 mil, the polyethylene layer was 2.5 mil.

The film was simultaneously biaxially drawn $6x^2$ at 140° C.

The Gurley Porosity of this film was 720 seconds. By contrast the Gurley Porosity of the oriented matrix without a heat seal layer thereon is about 60 seconds.

The film was heat sealed to itself in an impulse-type heat sealer at various temperatures. Seal properties are recorded in Table I.

TABLE I

| Sealing Temp. (°F.) | Peak Load (gf)* | Break Energy (cm-gf)** | Peel Energy (cm-gf) | Avg. Peel Strength (g/in. width) |
|---|---|---|---|---|
| 200 | 186.6 | (0 breaks) | 330.8 | 72.4 |
| 225 | 334.2 | 5.2 (2 breaks) | 318.3 | 74.5 |
| 250 | 174.2 | 12.4 (1 break) | 326.7 | 74.0 |
| 260 | 426.4 | 617.4 (1 break) | 368.9 | 95.8 |

*grams force
**centimeters-gram force

EXAMPLE 2

Using the same combination of materials as was employed in Example 1, a 16 mil/5 mil film was extruded and subjected to a simultaneous 5x longitudinal and transverse draw in a T. M. Long stretcher at 140° C. Gurley porosity of the resulting film was 480 seconds.

Seal properties are recorded in Table II.

TABLE II

| Sealing Temp. (°F.) | Peak Load (gf) | Break Energy (cm-gf) | Peel Energy (cm-gf) | Avg. Peel Strength (g/in. width) |
|---|---|---|---|---|
| 200 | 126.1 | (0 breaks) | 400.6 | 71.6 |
| 225 | 236.6 | 116.4 (1 break) | 422.6 | 88.2 |
| 250 | 270.5 | 21.8 (1 break) | 349.1 | 72.2 |
| 260 | 279.3 | 46.7 (2 breaks) | 392.3 | 85.7 |

EXAMPLE 3

The same matrix polymer as was used in Example 1 was coextruded with a propylene—6% ethylene copolymer (MFR 4.0; MP 129° C.) to form a 23 mil/7 mil film. This film was subjected to a simultaneous 6x longitudinal and transverse draw and a 6x transverse draw in a T. M. Long stretcher at 140° C. Gurley porosity of the resulting film was 2100 seconds. Sealing properties are recorded in Table III.

TABLE III

| Sealing Temp. (°F.) | Peak Load (gf) | Break Energy (cm-gf) | Peel Energy (cm-gf) | Avg. Peel Strength (g/in. width) |
|---|---|---|---|---|
| 200 | 1.07 | (0 breaks) | 0 | 0 |
| 225 | 41.5 | 130.0 (1 break) | 113.3 | 27.4 |
| 250 | 175.5 | (0 breaks) | 306.0 | 65.6 |
| 260 | 141.5 | (0 breaks) | 280.4 | 61.5 |

EXAMPLE 4

The porous, heat-sealable film from Example 2 was heat-sealed to various substrates in an impulse type sealer and exhibited the seal properties reported in Table IV.

TABLE IV

| Sealing Temp. (°F.) | Peak Load (gf) | Break Energy (cm-gf) | Peel Energy (cm-gf) | Avg. Peel Strength (g/in. width) |
|---|---|---|---|---|
| *Film Type and Origin* | | | | |
| EK500[1]-100 ga (Hercules) | | | | |
| 230 | 29.6 | 0 breaks | 117.1 | 27.4 |
| 240 | 37.3 | 0 breaks | 141.6 | 33.0 |
| 250 | 42.6 | 0 breaks | 168.5 | 39.4 |
| 260 | 39.5 | 0 breaks | 152.6 | 35.7 |
| 270 | 50.3 | 0 breaks | 189.9 | 44.5 |
| T502[2]-100 ga (Hercules) | | | | |
| 230 | 20.4 | 0 breaks | 58.2 | 13.4 |
| 240 | 26.3 | 0 breaks | 76.0 | 17.4 |
| 250 | 35.0 | 0 breaks | 85.9 | 20.0 |
| 260 | 31.2 | 0 breaks | 97.8 | 22.5 |
| 270 | 36.9 | 0 breaks | 127.5 | 29.6 |
| BX313[3]-100 ga (Hercules) | | | | |
| 230 | 30.1 | 0 breaks | 104.4 | 24.5 |
| 240 | 30.3 | 0 breaks | 110.3 | 25.7 |
| 250 | 36.7 | 0 breaks | 136.7 | 32.6 |
| 260 | 41.8 | 0 breaks | 151.1 | 36.0 |
| 270 | 50.4 | 0 breaks | 181.0 | 43.0 |
| Carded Polypropylene Fiber[4] Diaper Coverstock | | | | |
| 230 | 6.7 | 0 breaks | 13.3 | 31.8 |
| 240 | 14.0 | 0 breaks | 31.4 | 7.6 |
| 250 | 41.3 | 0 breaks | 118.3 | 29.0 |
| 260 | 54.1 | 0 breaks | 158.5 | 38.8 |
| 270 | 88.6 | 0 breaks | 265.3 | 65.7 |

[1] EK500-100 ga - An untreated, uncoated single layer OPP film.
[2] T502-100 ga - A one-side treated, uncoated single layer OPP film.
[3] BX313-100 ga - A modified, two-side treated, uncoated single layer OPP film.
[4] Carded Polypropylene Fiber Diaper Coverstock - A light weight nonwoven fabric made from polypropylene staple fibers.

What I claim is:

1. A gas permeable microporous film comprising a voided polyolefin matrix having, on at least one of its surfaces, a coating of a heat sealable polymer having a melting point at least 10° C. lower than that of the voided polyolefin matrix polymer.

2. The film of claim 1 wherein the matrix polymer is homopolypropylene.

3. The film of claim 1 wherein the matrix polymer is a blend of a homopolypropylene and a propylene—ethylene copolymer.

4. The film of claim 3 wherein the matrix polymer contains about 30 to 70% calcium carbonate, based on total weight of matrix polymer plus filler.

5. The film of claim 3 wherein the thickness ratio of the matrix film to heat sealable coating is about 3 to 1 to about 20 to 1, preferably about 5 to 1 to 20 to 1.

6. The film of claim 4 wherein the thickness ratio of the matrix film to heat sealable coating is about 3 to 1 to about 20 to 1, preferably about 5 to 1 to 20 to 1.

7. The film of claim 3 wherein the heat sealable coating is a medium or low density polyethylene or copolymer of ethylene with an alpha-olefin having 3 to 8 carbon atoms.

8. The film of claim 4 wherein the heat sealable coating is a medium or low density polyethylene or copolymer of ethylene with an alpha-olefin having 3 to 8 carbon atoms.

* * * * *